(12) United States Patent
Brennan et al.

(10) Patent No.: US 8,781,713 B2
(45) Date of Patent: Jul. 15, 2014

(54) SYSTEM AND METHOD FOR CONTROLLING A VALVE OF A CYLINDER IN AN ENGINE BASED ON FUEL DELIVERY TO THE CYLINDER

(75) Inventors: Daniel G. Brennan, Brighton, MI (US); Steven Joseph Swantick, Livonia, MI (US)

(73) Assignee: GM Global Technology Operations LLC

( * ) Notice: Subject to any disclaimer, the term of this patent is extended or adjusted under 35 U.S.C. 154(b) by 313 days.

(21) Appl. No.: 13/242,775

(22) Filed: Sep. 23, 2011

(65) Prior Publication Data

US 2013/0079960 A1   Mar. 28, 2013

(51) Int. Cl.
*F02D 28/00* (2006.01)

(52) U.S. Cl.
USPC ........... 701/112; 701/101; 701/105; 123/323; 123/198 F

(58) Field of Classification Search
USPC ................ 701/101, 103, 104, 105, 112, 108; 123/323, 568.14, 568.21, 568.23, 123/568.24; 180/65.28
See application file for complete search history.

(56) References Cited

U.S. PATENT DOCUMENTS

| | | | |
|---|---|---|---|
| 1,703,858 A | 3/1929 | Banner | |
| 3,157,166 A | 11/1964 | MacNeill | |
| 4,009,695 A | 3/1977 | Ule | |
| 4,044,652 A | 8/1977 | Lewis et al. | |
| 4,459,946 A | 7/1984 | Burandt | |
| 4,807,517 A | 2/1989 | Daeschner | |
| 5,373,818 A | 12/1994 | Unger | |
| 5,421,545 A | 6/1995 | Schexnayder | |
| 5,546,222 A | 8/1996 | Plaessmann et al. | |
| 5,572,961 A | 11/1996 | Schechter et al. | |
| 5,638,781 A | 6/1997 | Sturman | |
| 5,881,689 A | 3/1999 | Hochholzer | |
| 6,109,284 A | 8/2000 | Johnson et al. | |
| 6,112,711 A | 9/2000 | Shimizu et al. | |
| 6,263,842 B1 | 7/2001 | De Ojeda et al. | |
| 6,374,784 B1 | 4/2002 | Tischer et al. | |
| 6,505,584 B2 | 1/2003 | Lou | |
| 6,636,788 B2* | 10/2003 | Tamagawa et al. | 701/22 |
| 6,688,267 B1 | 2/2004 | Raghavan | |
| 6,739,293 B2 | 5/2004 | Turner et al. | |
| 6,848,422 B2 | 2/2005 | Hashizume et al. | |
| 6,886,510 B2 | 5/2005 | Sun et al. | |
| 6,910,449 B2 | 6/2005 | Strom et al. | |
| 6,910,461 B2 | 6/2005 | Tanei et al. | |
| 6,988,572 B2* | 1/2006 | Tatara et al. | 180/65.26 |
| 7,128,687 B2 | 10/2006 | Lewis | |

(Continued)

OTHER PUBLICATIONS

Animation and descriptions retrieved Aug. 31, 2011 from http://www.honda.co.nz/technology/driving/ivtec-with-variable-cylinder-management-vcm-2/.

(Continued)

*Primary Examiner* — Thomas Black
*Assistant Examiner* — Peter D Nolan

(57) ABSTRACT

A system for controlling an engine in a vehicle according to the principles of the present disclosure includes a fuel control module and a valve control module. The fuel control module controls fuel delivery to a cylinder of the engine. The valve control module closes an exhaust valve of the cylinder when fuel delivery to the cylinder is disabled during operation of the vehicle and exhaust gas has been exhausted from the cylinder after fuel delivery to the cylinder is disabled.

20 Claims, 3 Drawing Sheets

(56) References Cited

U.S. PATENT DOCUMENTS

| | | | |
|---|---|---|---|
| 7,146,966 B2* | 12/2006 | Nakamura | 123/481 |
| 7,441,538 B2 | 10/2008 | Strom et al. | |
| 7,461,619 B2* | 12/2008 | Price | 123/90.11 |
| 7,540,344 B2* | 6/2009 | Yamamoto et al. | 180/65.285 |
| 7,748,355 B2* | 7/2010 | Megli et al. | 123/90.15 |
| 7,793,637 B2 | 9/2010 | Strom et al. | |
| 8,037,850 B2 | 10/2011 | Pursifull | |
| 8,443,784 B2 | 5/2013 | Brennan | |
| 8,602,002 B2 | 12/2013 | Brennan | |
| 2001/0023674 A1 | 9/2001 | Shimizu et al. | |
| 2003/0015155 A1 | 1/2003 | Turner et al. | |
| 2003/0131805 A1 | 7/2003 | Yang | |
| 2003/0172885 A1 | 9/2003 | Gaessler et al. | |
| 2006/0243241 A1 | 11/2006 | Kuo et al. | |
| 2008/0078593 A1* | 4/2008 | Ortmann et al. | 180/65.2 |
| 2008/0092834 A1 | 4/2008 | Stein et al. | |
| 2008/0275622 A1 | 11/2008 | Strom et al. | |
| 2010/0236523 A1 | 9/2010 | Saruwatari et al. | |
| 2011/0315101 A1 | 12/2011 | Cleary et al. | |
| 2013/0068194 A1 | 3/2013 | Brennan | |

OTHER PUBLICATIONS

Engineering Matters, Inc., "Electromagnetic Fully Flexible Valve Actuator", Nov. 2005, 6 pages.
U.S. Appl. No. 12/850,930, filed Aug. 5, 2010, Daniel G. Brennan.
U.S. Appl. No. 13/238,388, filed Sep. 21, 2011, Daniel G. Brennan.

* cited by examiner

SYSTEM AND METHOD FOR CONTROLLING A VALVE OF A CYLINDER IN AN ENGINE BASED ON FUEL DELIVERY TO THE CYLINDER

FIELD

The present disclosure relates to systems and methods for controlling a valve of a cylinder in an engine based on fuel delivery to the cylinder.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel within cylinders to drive pistons. Air flow into the engine is regulated via a throttle. More specifically, the throttle adjusts a throttle area, which increases or decreases air flow into the engine. As the throttle area increases, the air flow into the engine increases. A fuel control system adjusts the rate that fuel is injected to provide a desired air/fuel mixture to the cylinders.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system for controlling an engine in a vehicle according to the principles of the present disclosure includes a fuel control module and a valve control module. The fuel control module controls fuel delivery to a cylinder of the engine. The valve control module closes an exhaust valve of the cylinder when fuel delivery to the cylinder is disabled during operation of the vehicle and exhaust gas has been exhausted from the cylinder after fuel delivery to the cylinder is disabled.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A fuel control system may stop fuel delivery to one or more cylinders of an engine to improve fuel economy. For example, fuel delivery may be stopped when engine load is less than a predetermined load. In another example, a hybrid vehicle may stop fuel delivery when a battery charge is sufficient to operate the hybrid vehicle using an electric motor. When fuel delivery is stopped, intake and exhaust valves of the cylinder are typically left open. In turn, intake air flows through the cylinder and through an exhaust system of the engine, cooling components in the exhaust system.

Exhaust systems typically include a catalyst that reacts with exhaust gas to reduce emissions. The catalyst reduces emissions most effectively when the temperature of the catalyst is greater than or equal to a light-off temperature. When fuel delivery is stopped, intake airflow through the exhaust system may cause the catalyst temperature to decrease to less than the light-off temperature, increasing emissions. This is likely with plug-in hybrid vehicles that may seldom start the engine to maintain battery charge. Fuel delivery may be started again simply to increase the catalyst temperature to the light-off temperature. However, this causes fuel economy to worsen.

A system and method according to the principles of the present disclosure closes intake and exhaust valves of a cylinder when fuel delivery to the cylinder is stopped. This prevents air from flowing through the cylinder and cooling a catalyst when fuel delivery is stopped. In turn, emissions may be reduced and fuel economy may be improved.

The intake and exhaust valves are actuated using a valve actuator. The valve actuator may be driven by a camshaft. For example, the valve actuator may be a hydraulic lifter that is coupled to the camshaft using a pushrod, or the camshaft may be an overhead camshaft and the hydraulic lifter may be directly coupled to the camshaft. Alternatively, the valve actuator may actuate the intake and exhaust valves independent from the camshaft. For example, the valve actuator may be an electromagnetic or electrohydraulic fully flexible valve actuator (FFVA) that controls timing and lift independently. Since the FFVA controls timing and lift independently, the FFVA may gradually reduce the valve lift before fully closing the intake and exhaust valves. This minimizes torque disturbances caused by closing the intake and exhaust valves.

Figure 1:
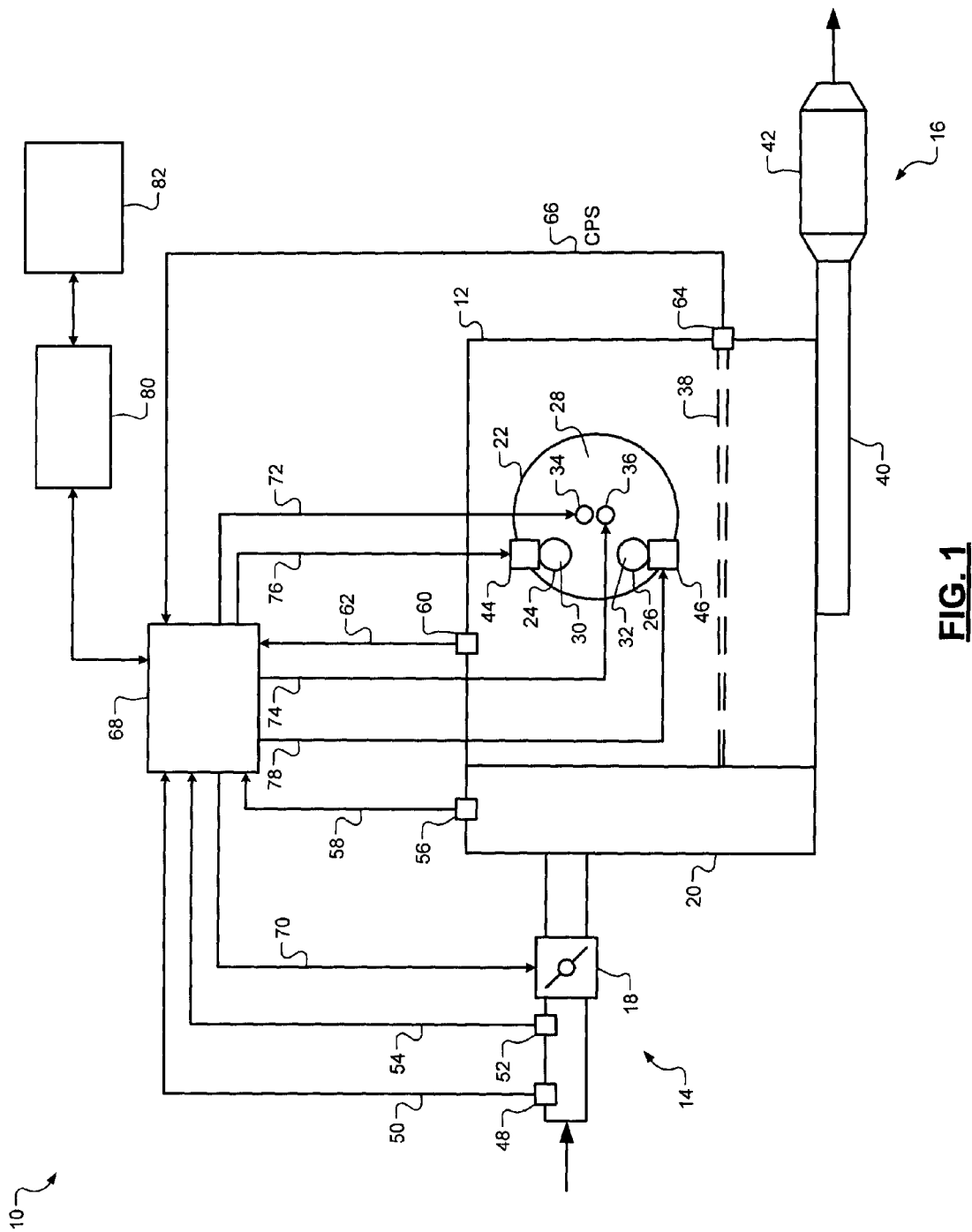
FIG. 1 is a functional block diagram of an engine system according to the principles of the present disclosure.

Referring to FIG. 1, an example implementation of an engine system 10 includes an engine 12, an intake system 14, and an exhaust system 16. The intake system 14 includes a throttle valve 18 and an intake manifold 20. The throttle valve 18 may be adjusted to control the amount of air drawn into the intake manifold 20.

The engine 12 defines a cylinder 22, an intake port 24, and an exhaust port 26. Although the engine 12 may include multiple cylinders, for illustration purposes, a single representative cylinder is shown. The engine 12 includes a piston 28, an intake valve 30, an exhaust valve 32, a spark plug 34, a fuel injector 36, and a crankshaft 38. The piston 28 is located in the cylinder 22 and coupled to the crankshaft 38. The intake valve 30 is located in the intake port 24, and the exhaust valve 32 is located in the exhaust port 26. The spark plug 34 and fuel injector 36 are located in the cylinder 22. Although the engine 12 may include multiple intake valves and multiple exhaust valves in each cylinder, for illustration purposes, a single representative intake valve and a single representative exhaust valve are shown.

The intake valve 30 opens to draw air from the intake manifold 20 into the cylinder 22. In the present example, the engine 12 is a direct injection engine and the fuel injector 36 injects fuel directly into the cylinder 22. However, the engine 12 may be a port injection engine and the fuel injector 36 may inject fuel into the intake port 24. In addition, the engine 12 is a spark-ignition engine and the spark plug 34 ignites the air/fuel mixture within the cylinder 22. However, the engine 12 may be a compression-ignition engine and compression within the cylinder 22 may ignite the air/fuel mixture. Combustion within the cylinder 22 drives the piston 28 to produce drive toque.

The exhaust valve 32 opens to exhaust combustion products through the exhaust system 16. The exhaust system 16 includes an exhaust manifold 40 and a catalytic converter 42. The exhaust manifold 40 directs exhaust gas from the cylinder 22 through the catalytic converter 42. The catalytic converter 42 includes a catalyst, such as a three-way catalyst, that reacts with exhaust gas to reduce engine emissions. The catalyst may reduce emissions most effectively when the temperature of the catalyst is greater than or equal to a light-off temperature.

An intake valve actuator 44 actuates the intake valve 30 and an exhaust valve actuator 46 actuates the exhaust valve 32. The valve actuators 44, 46 may be hydraulic lifters and may be driven by a camshaft (not shown). For example, pushrods (not shown) may couple the valve actuators 44, 46 to the camshaft, or the camshaft may be an overhead camshaft and the valve actuators 44, 46 may be directly coupled to the camshaft. Alternatively, the valve actuators 44, 46 may actuate the valves 30, 32 independent from the camshaft. For example, the valve actuators 44, 46 may each be a fully flexible valve actuator (FFVA), such as an electromagnetic FFVA or an electrohydraulic FFVA, which controls valve timing and valve lift independently.

Various sensors measure operating conditions of the engine 12 and output signals indicating the operating conditions. An intake air temperature (IAT) sensor 48 measures the temperature of intake air and outputs an IAT signal 50 indicating the intake air temperature. A mass airflow (MAF) sensor 52 measures the mass flow rate of intake air and outputs a MAF signal 54 indicating the mass flow rate.

A manifold absolute pressure (MAP) sensor 56 measures pressure within the intake manifold 20 and outputs a MAP signal 58 indicating the manifold pressure. An engine coolant temperature (ECT) sensor 60 measures the temperature of coolant circulated through the engine 12 and outputs an ECT signal 62 indicating the engine coolant temperature. A crankshaft position (CPS) sensor 64 measures the position of the crankshaft 38 and outputs a CPS signal 66 indicating the crankshaft position.

An engine control module (ECM) 68 receives the signals discussed above and controls the engine 12 based on the signals received. The ECM 68 outputs a throttle control signal 70 to control the throttle valve 18. The ECM 68 outputs a spark control signal 72 to control the spark plug 34. The ECM 68 outputs a fuel control signal 74 to control the fuel injector 36. The ECM 68 outputs an intake valve actuation (IVA) signal 76 to control the intake valve actuator 44. The ECM 68 outputs an exhaust valve actuation (EVA) signal 78 to control the exhaust valve actuator 46.

The ECM 68 may communicate with a hybrid control module (HCM) 80 to coordinate operation of the engine 12 and an electric motor 82. The electric motor 82 may be used to produce drive torque. The electric motor 82 may also function as a generator, and may be used to produce electrical energy for use by a vehicle electrical system and/or for storage in a battery (not shown). In various implementations, various functions of the ECM 68 and the HCM 80 may be integrated into one or more modules.

The ECM 68 may stop fuel delivery to one or more cylinders of the engine 12 to increase fuel efficiency. For example, the ECM 68 may stop fuel delivery to the cylinder 22 when load on the engine 12 is less than a predetermined load and/or when the charge of the battery is sufficient to produce drive torque using the electric motor 82. The ECM 68 may stop fuel delivery to the cylinder 22 by disabling the fuel injector 36.

The ECM 68 closes intake valve 30 and/or the exhaust valve 32 when fuel delivery to the cylinder 22 is stopped. This prevents intake air from flowing through the exhaust system 16 and cooling the catalyst. In turn, the ECM 68 may not need to restart fuel delivery to the cylinder 22 simply to heat the catalyst to the light-off temperature.

Figure 2:
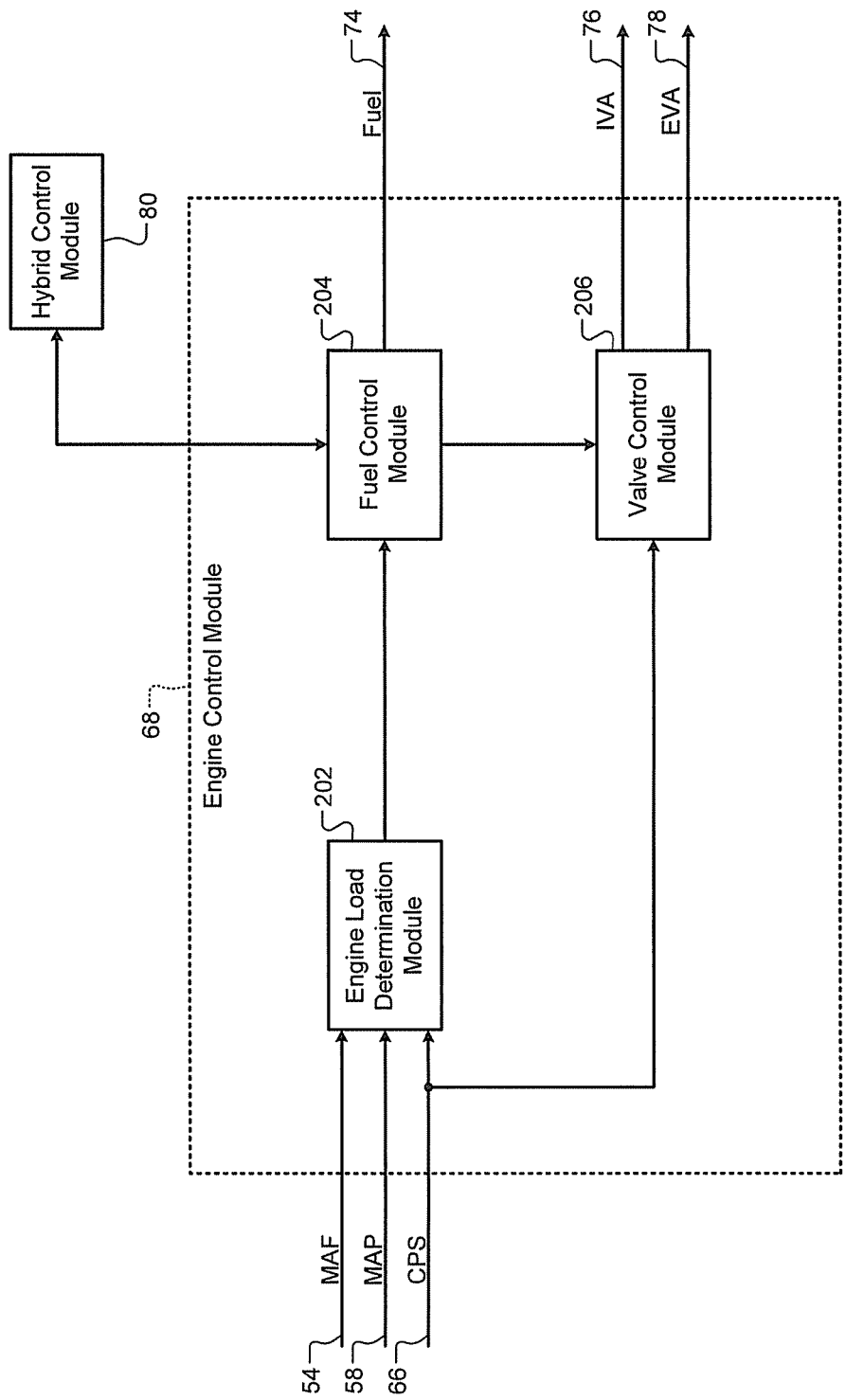
FIG. 2 is a functional block diagram of a control system according to the principles of the present disclosure.

Referring to FIG. 2, an example implementation of the ECM 68 includes an engine load determination module 202, a fuel control module 204, and a valve control module 206. The engine load determination module 202 determines engine load based on, for example, the mass flow rate indicated by the MAF signal 54, the manifold pressure indicated by the MAP signal 58, and/or the engine speed indicated by the CPS signal 66. The engine load determination module 202 outputs the engine load.

The fuel control module 204 outputs the fuel control signal 74 to control the fuel injector 36. The fuel control module 204 may disable the fuel injector 36 to stop fuel delivery to the cylinder 22. The fuel control module 204 may disable the fuel injector 36 when the engine load is less than a predetermined load. In addition, the HCM 80 may output the charge of the battery that supplies power to the electric motor 82, and the fuel control module 204 may disable the fuel injector 36 when the battery charge is greater than a predetermined charge. The fuel control module 204 outputs a signal to the valve control module 206 indicating when the fuel injector 36 is disabled.

The valve control module 206 outputs the IVA signal 76 and the EVA signal 78 to control the intake valve actuator 44 and the exhaust valve actuator 46, respectively. The valve control module 206 disables the exhaust valve actuator 46 to close the exhaust valve 32 when the fuel injector 36 is disabled. This prevents intake air from flowing through the exhaust system 16 and cooling the catalyst. The valve control module 206 may disable the intake valve actuator 44 to close the intake valve 30 when the exhaust valve 32 is closed. This prevents intake air from flowing into the cylinder 22 and increasing pumping losses. The valve control module 206 may enable the valve actuators 44, 46 when the fuel injector 36 is enabled.

The valve control module 206 may close the intake valve 30 and/or the exhaust valve 32 over a predetermined number of engine cycles (e.g., 10) to minimize torque disturbances caused by closing the intake valve 30 and/or the exhaust valve 32. The valve control module 206 may reduce lift of the valves 30, 32 by a predetermined percent (e.g., 10 percent) during each of the predetermined number of engine cycles before disabling the valve actuators 44, 46 to fully close the valves 30, 32. The fuel control module 204 may stop fuel delivery to all cylinders of the engine 12 when, for example, drive torque is produced using the electric motor 82, and the valve control module 206 may close the intake valves and/or exhaust valves of all of the cylinders.

The valve control module 206 may refrain from fully closing the exhaust valve 32 when the piston 28 has not completed an exhaust stroke after the fuel injector 36 is disabled. This ensures that combustion products are not trapped within the cylinder 22 when the fuel injector 36 is disabled. The valve control module 206 may determine when the piston 28 has completed an exhaust stroke based on the crankshaft position indicated by the CPS signal 66.

Figure 3:
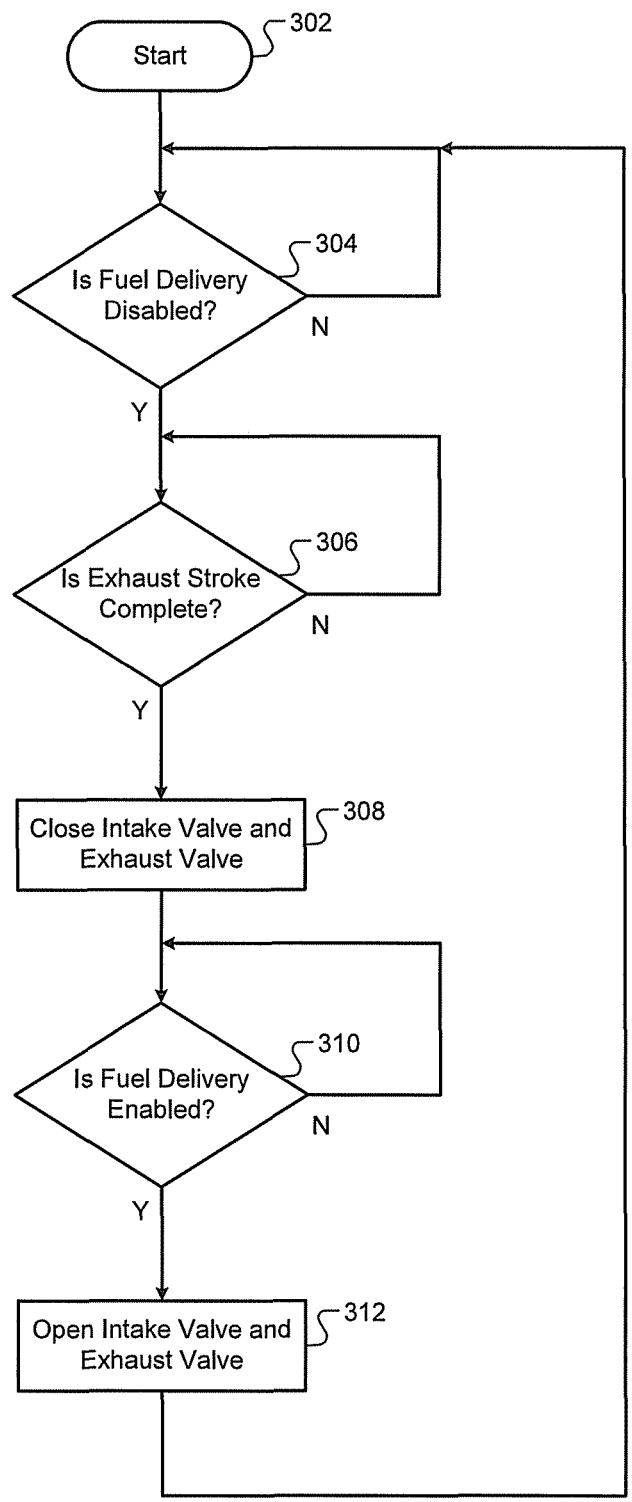
FIG. 3 is a flowchart illustrating a control method according to the principles of the present disclosure.

Referring to FIG. 3, a method for controlling an intake valve and an exhaust valve based on fuel delivery to a cylinder of an engine starts at 302. At 304, the method determines whether fuel delivery to the cylinder is disabled. If 304 is true, the method continues at 306. Fuel delivery to the cylinder may be disabled when the load on the engine is less than a predetermined load. In addition, an electric motor powered by a battery may supplement or replace drive torque produced by the engine, and fuel delivery to the cylinder may be disabled when the charge of the battery is less than a predetermined charge.

At 306, the method determines whether a piston within the cylinder has completed an exhaust stroke. If 306 is true, the method continues at 308. The method may determine whether the piston has completed an exhaust stroke based on a measured position of a crankshaft coupled to the piston. At 308, the method closes the intake and exhaust valves.

The intake and exhaust valves may be actuated using a valve actuator. The valve actuator may be driven by a camshaft. For example, the valve actuator may be a hydraulic lifter that is coupled to the camshaft using a pushrod, or the camshaft may be an overhead camshaft and the hydraulic lifter may be directly coupled to the camshaft. Alternatively, the valve actuator may actuate the intake and exhaust valves independent from the camshaft. For example, the valve actuator may be an electromagnetic FFVA or an electrohydraulic FFVA that controls timing and lift independently.

The method may close the intake and exhaust valves over a predetermined number of engine cycles to minimize torque disturbances caused by closing the intake and exhaust valves. For example, the method may reduce the lift of the intake and exhaust valves over the predetermined number of engine cycles. The method may then fully close the valves by disabling the valve actuator.

At 310, the method determines whether fuel delivery to the cylinder is enabled. If 310 is true, the method continues at 312. Fuel delivery to the cylinder may be enabled when the load on the engine is greater than or equal to the predetermined load. In addition, fuel delivery to the cylinder may be enabled when the battery charge is greater than or equal to the predetermined charge. At 312, the method opens the intake valve and/or the exhaust valve. The method continues at 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for controlling an engine in a vehicle, the system comprising:
   a fuel control module that controls fuel delivery to a cylinder of the engine; and
   a valve control module that incrementally closes an exhaust valve of the cylinder over N engine cycles when fuel delivery to the cylinder is disabled during operation of the vehicle, wherein N is a number greater than one.

2. The system of claim 1, wherein the fuel control module controls fuel delivery to the cylinder based on engine load.

3. The system of claim 1, wherein the vehicle is a hybrid vehicle that includes an electric motor and the fuel control module controls fuel delivery to the cylinder based on a charge of a battery that supplies power to the electric motor.

4. The system of claim 1, wherein the fuel control module generates a fuel control signal and a fuel injector stops injecting fuel into the engine based on the fuel control signal.

5. The system of claim 1, wherein the valve control module decreases a lift of the exhaust valve by a predetermined percent during each of the N engine cycles.

6. The system of claim 1, wherein the valve control module closes an intake valve of the cylinder when the valve control module closes the exhaust valve.

7. The system of claim 1, wherein the valve control module generates a valve actuation signal and a valve actuator actuates the exhaust valve based on the valve actuation signal.

8. The system of claim 7, wherein the valve control module disables the valve actuator when fuel delivery to the cylinder is disabled and the valve control module enables the valve actuator when fuel delivery to the cylinder is enabled.

9. The system of claim 7, wherein the valve actuator is driven by a camshaft of the engine.

10. The system of claim 7, wherein the valve actuator actuates the exhaust valve independent from a camshaft of the engine.

11. A method for controlling an engine in a vehicle, the method comprising:
    controlling fuel delivery to a cylinder of the engine; and
    incrementally closing an exhaust valve of the cylinder over N engine cycles when fuel delivery to the cylinder is disabled during operation of the vehicle, wherein N is a number greater than one.

12. The method of claim 11, further comprising controlling fuel delivery to the cylinder based on engine load.

13. The method of claim 11, wherein the vehicle is a hybrid vehicle that includes an electric motor, the method further comprising controlling fuel delivery to the cylinder based on a charge of a battery that supplies power to the electric motor.

14. The method of claim 11, further comprising generating a fuel control signal and a fuel injector stops injecting fuel into the engine based on the fuel control signal.

15. The method of claim 11, further comprising decreasing a lift of the exhaust valve by a predetermined percent during each of the N engine cycles.

16. The method of claim 11, further comprising closing an intake valve of the cylinder when the exhaust valve is closed.

17. The method of claim 11, further comprising generating a valve actuation signal, wherein a valve actuator actuates the exhaust valve based on the valve actuation signal.

18. The method of claim 17, further comprising disabling the valve actuator when fuel delivery to the cylinder is disabled and enabling the valve actuator when fuel delivery to the cylinder is enabled.

19. The method of claim 17, wherein the valve actuator is driven by a camshaft of the engine.

20. The method of claim 17, wherein the valve actuator actuates the exhaust valve independent from a camshaft of the engine.

\* \* \* \* \*